United States Patent

[11] 3,557,726

| [72] | Inventor | William T. S. Montgomery<br>Jacksonville, Fla. |
|---|---|---|
| [21] | Appl. No. | 794,690 |
| [22] | Filed | Jan. 28, 1969 |
| [45] | Patented | Jan. 26, 1971 |
| [73] | Assignee | Jacksonville Blow Pipe Company<br>Jacksonville, Fla.<br>a corporation of Florida |

[54] INCINERATOR
5 Claims, 3 Drawing Figs.

[52] U.S. Cl............................................. 110/18
[51] Int. Cl.............................................. F23g 7/00
[50] Field of Search................................. 110/7, 8, 18, 15, 106

[56] References Cited
UNITED STATES PATENTS

| 1,817,228 | 8/1931 | Bliss .......................... | 110/8X |
| 2,213,668 | 9/1940 | Dundas et al. ................ | 110/15 |
| 2,527,934 | 10/1950 | Jefferies, Sr. ................ | 110/18X |
| 2,614,513 | 10/1952 | Miller et al. ................. | 110/7 |
| 2,916,217 | 12/1959 | Yellott ........................ | 110/106X |
| 3,387,574 | 6/1968 | Mullen ........................ | 110/7 |
| 3,396,681 | 8/1968 | Hubbard ...................... | 110/8 |
| 3,453,976 | 7/1969 | Burden, Jr., et al ......... | 110/7X |
| 3,456,603 | 7/1969 | Studler ........................ | 110/7 |

Primary Examiner—Kenneth W. Sprague
Attorney—Strauch, Nolan, Neale, Nies & Kurz

ABSTRACT: A system for destruction of inflammable particulate waste wherein waste suspended in an amount of air sufficient to support complete combustion is blown into the lower end of a combustion chamber tangentially of the cylindrical chamber wall where it is ignited and travels during combustion in a helical path to an exhaust at the top of the chamber.

PATENTED JAN 26 1971

INVENTOR
WILLIAM T. S. MONTGOMERY
BY Strauch Nolan Neale Nies & Kurz
ATTORNEYS

PATENTED JAN 26 1971

INVENTOR

WILLIAM T. S. MONTGOMERY

BY
Strauch Nolan Neale Nies + Kurz
ATTORNEYS

INCINERATOR

SPECIFICATION

The present invention relates to incinerators and primarily to incinerators for disposing of flammable waste from any source, such as lumber mills, paper mills, veneer mills, box factories and the like, retail stores, assembly plants, hospitals, municipalities, and other various sources of trash. These sources produce a substantial amount of waste wood, paper, cardboard and other combustible wastes which present a very real and expensive handling and disposal problem. Because of the flammable nature of this waste, there is also a fire hazard if the waste is allowed to accumulate.

One of the best ways to dispose of such waste is by burning it as it occurs so that the flammable waste does not accumulate as a fire hazard and is substantially and entirely destroyed. Incineration eliminates substantial handling expense and is a complete answer to the disposal problem. Various incinerators have been proposed and have been effective to a greater or lesser degree for disposing of flammable waste products in an effective and economic manner. Two such incinerators are shown in U.S. Pat. Nos. 3,022,753 and 3,248,178 and these incinerators have been successfully used in disposing of wood, paper and similar waste.

In recent years air pollution has become a recognized health hazard and many states have strict laws regarding the discharge of smoke, flyash, or other pollutants into the atmosphere, as well as strict laws and regulations regarding the discharge of sparks or burning materials from incinerators or the like. These air pollution laws and regulations and fire and safety laws and regulations add important and difficult conditions which must be met by an industrial incinerator over and above the need for complete and efficient consumption of the flammable waste materials. Many incinerators which fully meet all requirements for safe and efficient combustion of waste cannot satisfy the high standards set to prevent air pollution.

Even when combustion is complete some products such as rubber, certain plastics and the like, may give off noxious or unpleasant fumes or gases which might violate air pollution laws. Usually such fumes or odors are completely destroyed if the temperature in the incinerator is sufficiently high. On the other hand, if the incinerator temperature is excessively high, material cost can become prohibitive relative to capacity.

Moisture in the waste reduces the temperature in the incinerator so that excessive moisture is to be eliminated. Wood bark often requires a preliminary drying and waste such as garbage which has a very high moisture content and an unpleasant odor requires a preliminary drying so that the incinerator may reach and maintain temperatures sufficiently high to destroy the odor. Suitable preliminary drying systems may be provided utilizing the heat generated by the incinerator or separate auxiliary drying systems may be used when desired. In any event, the preliminary drying is not a part of the present invention.

Capacities of conventional refractory incinerators are limited to the amount of heat the refractory can tolerate before breaking down, often to the point of complete failure. Methods of constructing conventional incinerators are based on the use of refractory as a means of holding and insulating the heat of incineration, combating abrasion, and forming the space for combustion. Elaborate means and devices are used to supply air for combustion and cooling and to eliminate smoke, odor, flyash, sparks, and other contaminants from the stack exhaust. In many instances these devices are most ineffective. The costs of construction of conventional refractory incinerators, as well as the operational and maintenance costs, are very high.

The present invention overcomes the foregoing difficulties and provides an incinerator in which combustible waste products are efficiently burned at a sufficiently high temperature to destroy odors and without the production of smoke, flyash, sparks or other air contaminants in excess of emissions permitted by regulations.

One of the objects of the present invention is to provide an incinerator which will safely and efficiently burn combustible materials without pollution of the atmosphere.

Another object is to provide an incinerator in which particles of combustible material are burned in a stream of air moving at a velocity sufficient to maintain the particles in suspension until combustion is substantially complete.

Another object is to provide an incinerator having a substantially cylindrical vertical combustion chamber in which particles of combustible material are introduced tangentially at or near the bottom of the incinerator in a moving stream of air and in which the particles are suspended in the air stream until combustion is substantially complete.

Another object is to provide an incinerator in which particles of flyash and any unburned particles are trapped at the top by the tangentially moving air stream and allowed to burn or drop back into a heat zone to be consumed.

Another object is to provide an incinerator in which the burning material is controlled, so that only gases considered clean to acceptable limits of emission are emitted as exhaust.

Another object is to provide an incinerator with a controlled flow pattern of air inside the incinerator.

Another object is to provide an incinerator with reduced internal turbulence by introducing the combustion air and combustible material near the bottom of the incinerator and maintaining the air and material in a substantially smooth, continuous, helical path throughout the incinerator.

Another object is to provide an incinerator having excess air supplied tangentially near the bottom to support the combustion of material and to control the flame temperature, shell wall temperature, and the flue gas temperature.

Another object is to provide an incinerator in which the combustible material in introduced tangentially near the bottom of the combustion chamber on a moving stream of air and in which the air path is uninterrupted so that the air and material can continue to move tangentially in the combustion chamber and rise through the chamber.

Another object is to provide an incinerator which will conduct, convect, and radiate heat to the extent necessary to prevent unnecessarily high temperatures.

These and other objects and advantages reside in certain novel features of construction, arrangement and combination of parts as will herein after be fully set forth and pointed out in the appended claims.

Referring to the drawings.

Figure 3:
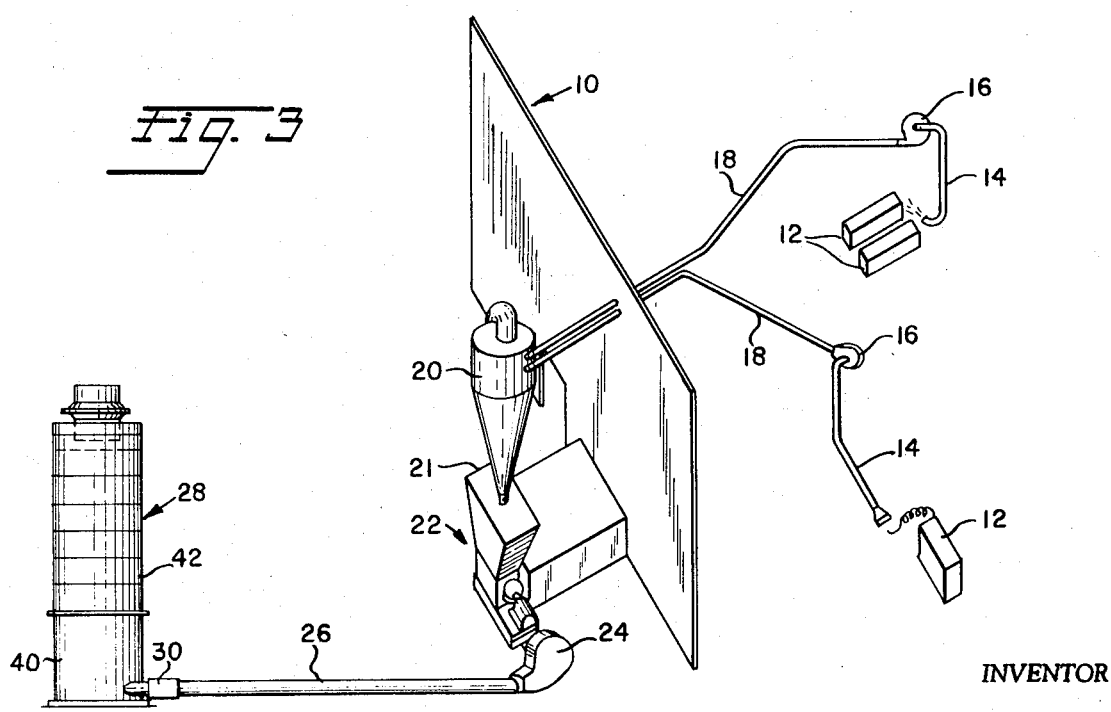
FIG. 3 is a schematic view showing a typical system of collecting and delivering waste material to the incinerator.

One form of system for collecting and delivering flammable waste to the incinerator is illustrated diagrammatically in FIG. 3 wherein 10 indicates an outer wall of a factory or mill in which machines 12 such as cutters, trimmers, or the like are located. Suction members 14 which may be flexible, are located adjacent the various machines 12 and are connected to the suction side of one or more centrifugal fans or blowers 16. The pressure sides of the fans or blowers 16 are connected through one or more pipes 18 to a centrifugal separator 20 which may be located inside or outside the building.

Frequently, the flammable waste occurs in strips, sheets or chunks and the solid material may be dropped from the separator 20 into the hopper 21 of a reducing or chopping machine indicated generally at 22. One very efficient reducing or chopping machine is shown in U.S. Pat. No. 2,869,793. The suction pickup system can of course be eliminated and the waste or trash collected in carts or barrels and dumped into the hopper 21 of the reducing apparatus 22. The apparatus 22 reduces the waste wood, paper or the like, to small pieces and these pieces are drawn into the low-pressure side of a centrifugal fan or blower 24 from which they are then blown through a pipe 26 to the incinerator 28 for destruction.

Figure 1:
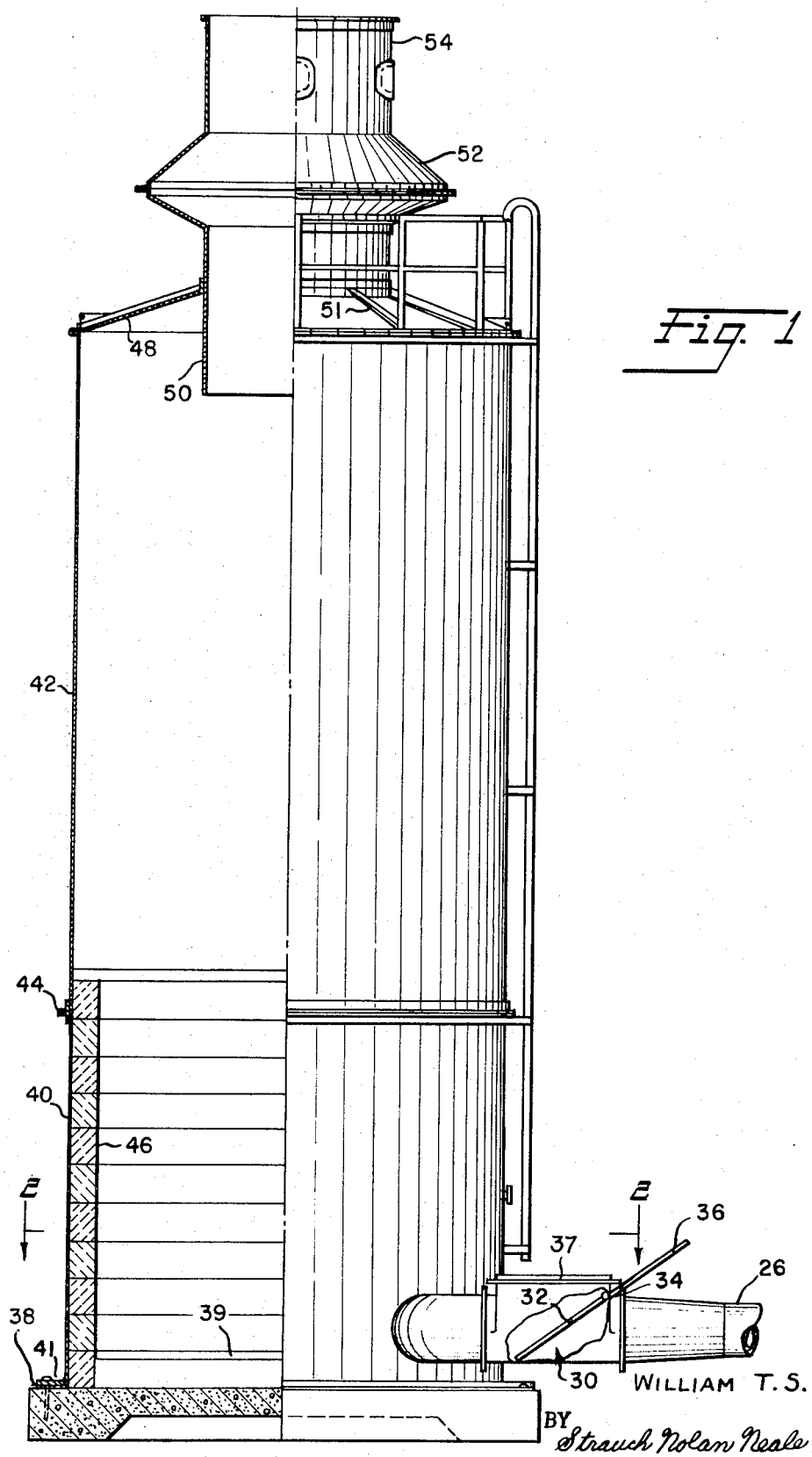
FIG. 1 is an elevation of the incinerator with parts in section.
Figure 2:
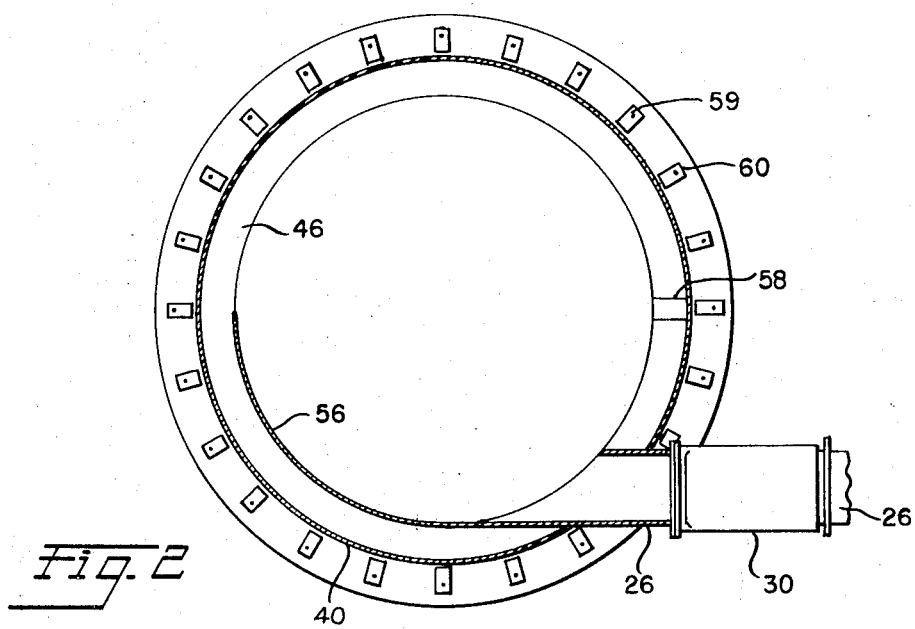
FIG. 2 is a section of the incinerator on line 3—3 showing the material and air inlet.

The reduced particles or pieces of combustible waste are carried through the pipe 26 on a moving stream of air and are introduced into the incinerator 28 tangentially near the bottom as shown in FIGS. 1 and 2.

A check valve 30 is located in the pipe 26 adjacent the incinerator 28. A flap 32 is freely pivoted at 34 and a balancing counterweight 36 is also mounted on pivot 34. When the fan or blower 24 is operating and blowing air and material through the pipe 26 the pressure of the air stream is sufficient to hold the valve flap 32 in open position, but when the fan or blower 24 stops, the flap 32 automatically is swung closed due to the counterweight and prevents flame or hot gas from the incinerator from moving back into the pipe 26. Valve 30 has an openable cover 37 for cleaning.

A preferred form of incinerator according to the present invention is shown in FIGS. 1 and 2 and comprises a substantially flat base 38 which is a reinforced concrete foundation suitable for local conditions of bearing, either poured directly in the ground or on piling. The casing 40 of the incinerator is secured to this foundation by anchor bolts 59. The floor 39 is refractory material and is substantially flat and horizontal.

The body of the incinerator is a vertical cylinder formed of suitable material such as stainless steel or the like. The body may be formed into two sections, a lower section 40 secured to the base 38 by bolts 59 and an upper section 42, the two sections having mating flanges which are suitable secured together as indicated at 44. The lower portion of the incinerator is preferably lined with abrasion resistant refractory 46 while the upper portion is unlined an unjacketed and consists of a cylindrical tube of appropriate material such as stainless steel. An annular cap 47 of cast refractory material provides a smooth transition surface between the inner surface of refractory 46 and the inner surface of the body at 42. Both the upper and lower portions of the incinerator may be formed of a single sheet or tube of metal or may be formed of a plurality of metal sheets or tubes fastened together.

The top of the incinerator is closed by a cover 48. A cylindrical stack is mounted in the cover 48 and has a lower portion 50 which extends through the sheet or cover 48 for a short distance into the interior of the incinerator.

This stack portion 50 is substantially concentric with the wall of the incinerator and provides an outlet for gases and products of combustion. The sheet or cover 48 is slightly conical and may be provided with exterior reinforcing members 51. As shown in FIG. 1 the stack portion 50 may be provided with an enlarged portion 52 outside the incinerator for receiving a screen or spark arrester, not shown, if required by a local code.

Above the enlarged portion 52 there is a further stack portion 54. Because of the efficiency with which combustible waste products are burned, it is unnecessary to have a tall stack as is usually required with other incinerators or furnaces.

As shown in FIGS. 1 and 2, the pipe or conduit 26 enters tangentially to the wall at or near the floor of the incinerator. A liner 56 preferably extends from the junction of the pipe 26 and the incinerator around at least a part of the inner wall of the incinerator as shown in FIG. 2. This liner 56 is formed of alloy metal or the like to protect the fire brick 46 from the abrasion by the waste particles which enter the incinerator at a relatively high velocity on the moving stream of air.

A suitable ignition system, not shown, is normally connected at the lower portion of the incinerator at a suitable fitting 58. One suitable form of ignition system is a propane or other gas burner with a separate fan to blow the gas flames into the incinerator chamber. This fan is operated continuously to prevent material from entering the ignition system from the interior of the combustion chamber. The gas auxiliary flame may burn continuously or may be turned off after combustion has begun.

In the illustrated system, a gas auxiliary ignition system is started; the waste is picked up by the suction heads 14, reduced or chopped into small pieces by the reducing mechanism 22 and blown through the pipe 26; the air pressure opens the valve 30; the air stream carrying the combustible material enters the incinerator tangentially at a velocity at least sufficient to maintain the combustible material in suspension in the air stream. The combustible material is ignited by the ignition system and burns as it continues in a helical path from the bottom of the incinerator toward the top. The incinerator is so designed and constructed that the combustible materials being heavier than air, are held by centrifugal force of the combustion air tangentially to and adjacent the wall of the incinerator, suspended in the combustion air until combustion is complete, while the combustion air and products of combustion which have become gasses, can escape through the stack in the center of the top without carrying with them any of the combustible materials. Unburned particles and flyash are retained until completely consumed.

The air passing through the pipe 26 and entering the incinerator 28 is at or about ambient temperature and moving at sufficient velocity to maintain the combustible material in suspension. The increase of temperature within the incinerator increases the velocity of the air and material along the helical path. When the burned, unburned or burning particles strike each other or strike the incinerator wall at these very high velocities, the particles are further reduced in size and more surface area is subjected to the hot gasses so that combustion is improved and accelerated and noncombustible material is reduced to a fine powder.

The lower portion 46 of the incinerator will be subjected to the highest temperatures and will contain the major quantity of the burning material and fire and accordingly should be able to withstand temperatures in the neighborhood of 3,000°F. without deterioration or failure. The entire surface area of this zone will be constantly cooled by the entering air stream moving tangentially to and adjacent to the refractory and the liner 56.

The upper section 42 of the incinerator will also be subjected to high temperatures so the material of this section should be of alloy steel or various grades of stainless steel, or any other suitable material which will withstand the upward spiral movement of the air stream and combined mass of heat, flame, and burning material from the lower portion 46 and allow this mass to be consumed within. Local conditions such as salt in the atmosphere and chemical components and hardness of the combustible particles also influence the choice of construction material. In addition to confining and guiding the combustion stream along a helical path upper section 42 of the incinerator performs a twofold function. First there is the need for a metallic or other conductive wall which will readily conduct heat and dissipate it by a combination of conduction to the air, convection with the air, and radiation. Secondly, the material must be capable of withstanding the necessary internal temperature for clean burning without deterioration and at the same time maintain sufficient strength to support its own weight. The selection of the material is primarily an economic consideration and there are a wide range of materials which possess the characteristics from an engineering performance requirement standpoint. The construction material selected will vary depending on the specific application and conditions to be met.

The temperature within the incinerator depends on the B.t.u. content of the waste, its particle size, its moisture content, the rate (pounds per hour) at which the waste is introduced, the quantity of air introduced, and the design of the incinerator. There is a relationship between the B.t.u. content of the fuel and the exposed metal surface area of the upper section 42. There will be an optimum air-material ratio to provide clean burning, which may vary depending on the material, and there are limits to either side of the optimum which will still provide clean burning.

For a given configuration (height-diameter ratio) there is a definite limitation on the quantity of material that can be burned and on the amount of air required for proper burning in a given time. There is a relationship between the diameter of the incinerator, the quantity of material and air, the height of the flame within the unit. There is a relationship between the exhaust stack diameter, the inlet diameter, the CFM entering the incinerator, and the quantity of material burned since it is necessary to limit the exhaust gas velocity to levels that will provide clean burning. These relationships and ratios will be incorporated in the design of each size model of the incinerator according to the amount and type of waste to be consumed by the individual unit.

Part of the heat is dissipated from the incinerator through the exhaust gases and a large portion is radiated and convected from the upper, unlined portion of the incinerator. The amount of heat dissipated from the upper portion of the incinerator's body depends upon the temperature differences between the incinerator shell and wall and the ambient atmosphere, the thickness and conductivity of the metal shell, and the exposed surface area of the shell. Because of the required high strength and heat conductivity this shell is preferably of metal, preferably a grade of stainless steel.

As the air stream moves upward through the incinerator in a helical path, the heavier particles of waste are thrown outward toward the shell and are abraded or turned in the air stream, as well as being consumed by flame. Abrasion tends to reduce the particle size and turning or upsetting of the particles insures that all parts of each particle are completely exposed to the hot combustion gasses. The abrasion and upsetting both contributes to the speed and completeness of combustion and insures that larger particles which are incompletely burned cannot enter the stack 50 but remain suspended in the air stream trapped between the incinerator shell 42 and the lower portion 50 of the stack. The velocity of the hot gasses of incineration also add to the effectiveness of separation of particles and exhaust gasses.

The specific unit shown in the drawings was designed and intended for the disposition of so-called Type I waste, rubbish consisting of combustible waste such as paper, cartons, rags, wood scraps, sawdust, foliage, and floor sweepings from domestic, commercial and industrial activities. This system and the incinerator will handle small metal particles such as wire strapping, staples and metal clips, and some amounts of tramp metal within the limits of maintenance cost. The incinerator will also be suitable for other types of waste.

In starting up this system, the burner blower of the gas-fired ignition system (not shown) is the first to start. It continues to run throughout the burning cycle of the incinerator to prevent the pressure within the incinerator, caused by the blower 24 blowing into the incinerator, from blowing out the flame of the gas burner or from blowing materials into the burner tube.

The auxiliary gas flame then ignites and continues to burn, unless turned off manually, or until a flame sensor (not shown) determines that the materials have ignited and are supporting combustion, at which time the flame sensor turns off the gas supply to the gas burner. If the flame in the incinerator dies down for lack of incoming materials, the flame sensor turns the gas flame back on and keeps it on until the incoming materials again establish a flame supporting its own combustion. A suitable safety device (not shown) may be built into this flame sensor. If the flame sensor turns on the gas and the gas is not ignited, it automatically cuts off the whole system until the trouble is corrected. Satisfactory ignition systems and flame sensors meeting the above conditions are known and are commercially available.

As soon as flame is established in the ignition or auxiliary burner system, the blower 24 is started and when the blower is up to speed, the reducing apparatus 22 is started. When the reducing apparatus is up to speed, the vacuum pickup system 14 to 20 is started. When there is no vacuum pickup system and the waste is fed into the hopper 21 from barrels or boxes or from a conveyor belt or the like, the waste may be introduced into the hopper 21 at any time after the breaker 22 is up to speed. Various other methods of feeding and conveying waste materials to the unit may be used.

The normal procedure for shutting down the incinerator in this type of system is to first stop the vacuum system 14 to 20. After a suitable period to be sure the system is clean and there is nothing else to grind up, the reducing apparatus 22 is shut down. Fan 24 continues to operate for sufficient time to be sure that any materials left in the pipe 26 and incinerator are completely burned up, then fan 24 is shut down. The auxiliary gas burner is shut down and lastly the burner-blower is turned off. An emergency stop may be initiated by manually activating a switch on the control panel; automatically by the loss of the flame in the auxiliary gas burner; or automatically by a flame temperature instrument activated by a thermocouple within the incinerator. Such a thermocouple (not shown) may be located in the exhaust stack 50 and when the temperature in the stack reached a point that is too high, from overfeeding the incinerator, this thermocouple activates an alarm at feed hopper 21 to stop feeding of the incinerator and at the same time to actuate a valve between the separator and feed hopper 21 to discharge the materials to the outside of the system. By stopping the feed to the incinerator the temperature will rapidly drop to acceptable and safe limits.

An alternative emergency stop may be provided to stop the feed of material to the incinerator by stopping the shredding apparatus 22 and the blower 24. An alarm or signal may be activated and the check valve 30 in the pipe 26 automatically closes, keeping any heat, burning material, or flame from entering the pipe line 26. This emergency stop condition will be in effect until any problem is corrected and the control system manually reset. The feeding and incineration process may then be reactivated as described above.

The specific installation referred to involves the burning of corrugated paper, both waxed an unwaxed, from a box factory and incineration is complete. There is no smoke or other discharge from the stack visible to the naked eye and substantially no ash or residue is left in the incinerator. Samples of the discharged exhaust gasses were analyzed and found to be exceptionally clean. Under the worst possible conditions of loading and combustion the levels of emission were less than half of the normal acceptable limits for incinerators, according to the State of Florida Board of Health Air Pollution Regulations. The interior of the incinerator and the incinerator floor need to be cleaned very infrequently.

From the foregoing, it will be apparent that the objects of the invention have been attained, and a new, improved, efficient device for collecting and disposing of flammable waste has been provided. The flammable waste is substantially completely consumed without the discharge of smoke, fumes or other contaminants and with a surprisingly small ash or other residue. Various modifications of the invention can, of course, be made to meet particular conditions and requirements without departing from the spirit of the invention or the scope of the appended claims.

I claim:

1. An incinerator comprising means defining a substantially vertical substantially cylindrical combustion chamber having a sidewall and bottom, said sidewall being formed of metal and the lower portion of said sidewall from the bottom of said chamber to a predetermined height of said chamber being lined with refractory material, a supply pipe secured at the lower end of said combustion chamber for introducing air and fuel substantially tangentially of the combustion chamber at the bottom thereof, a top for said combustion chamber, and a cylindrical stack secured in said top and extending into said combustion chamber substantially coaxial therewith and spaced from said sidewall of said chamber, the inner surface of said sidewall being substantially free from obstructions throughout its height which would impede or deflect the flow of air passing through said chamber.

2. An incinerator as defined in claim 1 including means for maintaining within the incinerator a temperature not less than about 1,200°. and not more than about 1,600F ·

3. An incinerator as defined in claim 1 including means for maintaining the air entering from said supply pipe at a velocity sufficient to retain particulate combustible material to be burned in suspension.

4. An incinerator comprising means defining a substantially vertical substantially cylindrical combustion chamber having a sidewall and substantially flat bottom, the sidewall of said combustion chamber being formed of stainless steel or the like and the lower portion of said wall from the bottom of said combustion chamber to about one-third its height being lined with refractory material, a supply pipe secured at the lower end of said combustion chamber for introducing air and fuel substantially tangentially of the combustion chamber at the bottom thereof, a top for said combustion chamber, and a cylindrical stack secured in said top and extending into said combustion chamber substantially coaxial therewith and spaced from said sidewall, the inner surface of said sidewall being substantially free from obstructions throughout its height which would impede or deflect the flow of air passing through said chamber.

5. An incinerator as defined in claim 4 including an abrasion resistant shield on the surface of said refractory material from the supply pipe around a portion of the interior of said incinerator.